(12) United States Patent
Kinstner et al.

(10) Patent No.: US 10,254,846 B1
(45) Date of Patent: Apr. 9, 2019

(54) SYSTEMS AND METHODS TO FACILITATE INTERACTIONS WITH VIRTUAL CONTENT IN AN AUGMENTED REALITY ENVIRONMENT

(71) Applicant: META COMPANY, San Mateo, CA (US)

(72) Inventors: Zachary R. Kinstner, Ada, MI (US); Jared Bott, Foster City, CA (US); Ryan Goodrich, San Mateo, CA (US)

(73) Assignee: META COMPANY, San Mateo, CA (US)

( * ) Notice: Subject to any disclaimer, the term of this patent is extended or adjusted under 35 U.S.C. 154(b) by 175 days.

(21) Appl. No.: 15/459,852

(22) Filed: Mar. 15, 2017

(51) Int. Cl.
| | |
|---|---|
| *G06F 3/01* | (2006.01) |
| *G06T 7/73* | (2017.01) |
| *G06T 19/00* | (2011.01) |
| *G06T 7/557* | (2017.01) |
| *G06F 3/0481* | (2013.01) |
| *G06F 3/0484* | (2013.01) |
| *G06F 3/0487* | (2013.01) |

(52) U.S. Cl.
CPC .............. *G06F 3/017* (2013.01); *G06F 3/011* (2013.01); *G06F 3/0487* (2013.01); *G06F 3/04812* (2013.01); *G06F 3/04842* (2013.01); *G06F 3/04847* (2013.01); *G06T 7/557* (2017.01); *G06T 7/73* (2017.01); *G06T 19/006* (2013.01); *G06T 2207/10052* (2013.01); *G06T 2207/30196* (2013.01)

(58) Field of Classification Search
CPC ..... G06F 3/017; G06F 3/04842; G06F 3/0485
See application file for complete search history.

(56) References Cited

U.S. PATENT DOCUMENTS

| | | | | |
|---|---|---|---|---|
| 9,846,486 | B2 * | 12/2017 | Katz | ............... G06F 3/013 |
| 2004/0166934 | A1 | 8/2004 | Nakata | |
| 2009/0077504 | A1 | 3/2009 | Bell | |
| 2009/0289914 | A1 * | 11/2009 | Cho | ............... G06F 3/044 |
| | | | | 345/173 |
| 2014/0201690 | A1 | 7/2014 | Holz | |

(Continued)

OTHER PUBLICATIONS https://www.youtube.com/watch?v=4sKI_2XYMFs&feature=youtu.be&t=2m29s; DevUp: VR Guitar/Harp/Instrument (Oct. 22, 2015).

(Continued)

*Primary Examiner* — Patrick F Marinelli
(74) *Attorney, Agent, or Firm* — Sheppard Mullin Richter & Hampton LLP

(57) ABSTRACT

A system configured to facilitate interactions with virtual content in an augmented reality environment may comprise one or more of a hand tracking device, a light source, an optical element, one or more physical processor, non-transitory electronic storage, and/or other components. The hand tracking device may be configured to generate output signals conveying positions of a digit of a user's hand over time. The light source may be configured to emit light forming images of virtual content. The optical element being configured to provide the light emitted from the light source into one or more eyes of a user. A visual indicator may be provide that visually indicates a perceived distance between the virtual content and the digit.

16 Claims, 7 Drawing Sheets

(56) References Cited

U.S. PATENT DOCUMENTS

| | | | | |
|---|---|---|---|---|
| 2014/0320434 A1* | 10/2014 | Pantel | ................... | G06F 3/017 |
| | | | | 345/173 |
| 2015/0130764 A1* | 5/2015 | Woolley | ............... | G06F 3/0416 |
| | | | | 345/174 |
| 2015/0293644 A1* | 10/2015 | Watanabe | ............. | G06F 3/0426 |
| | | | | 345/168 |
| 2016/0179205 A1* | 6/2016 | Katz | ....................... | G06F 3/013 |
| | | | | 345/156 |
| 2016/0189427 A1 | 6/2016 | Wu | | |
| 2016/0364091 A1* | 12/2016 | Bernstein | ............ | G06F 3/03545 |
| 2017/0010754 A1* | 1/2017 | Kresl | ..................... | G06F 3/033 |
| 2017/0185151 A1 | 6/2017 | Pahud | | |
| 2017/0235143 A1 | 8/2017 | Chi | | |
| 2017/0351338 A1* | 12/2017 | Bondan | ................... | G06F 3/005 |
| 2018/0046245 A1* | 2/2018 | Schwarz | ............ | G02B 27/0093 |
| 2018/0068476 A1* | 3/2018 | Ono | ....................... | G06F 3/0484 |

OTHER PUBLICATIONS https://www.youtube.com/watch?v=hFpdHJA9uR8 ; Hoverboard VR Interface; Mar. 12, 2015.
https://youtu.be/RNTXWV-P99k?t=14s; Firework Factory VR: Walk-through (v1.0.2); Oct. 3, 2015.

\* cited by examiner

SYSTEMS AND METHODS TO FACILITATE INTERACTIONS WITH VIRTUAL CONTENT IN AN AUGMENTED REALITY ENVIRONMENT

FIELD OF THE INVENTION

The systems and methods described herein relate to interactions with virtual content in augmented reality environments.

BACKGROUND OF THE INVENTION

There are many types of vision systems that provide virtual or augmented reality displays. In particular, wearable technology such as head mounted displays (HMD) are becoming more popular.

SUMMARY

The systems and methods described herein facilitate interactions with virtual content (e.g., virtual objects in the form of three-dimensional digital imagery) in an augmented reality environment. The augmented reality environment may be generated by superimposing images forming virtual content over views of the real world. Virtual content may be formed by a three-dimensional light field so that the virtual content may be perceived to be within the user's field of view. Some users may have difficulty judging and/or perceiving distance of virtual content within their field-of-view. In some cases, when a user attempts to interact with virtual content, for example, using their hand, the user may inadvertently "push through" the virtual content and/or otherwise misjudge the distance of the content within their field-of-view. The systems and methods described herein propose one or more solutions to aid a user in interacting with virtual content. One or more visual indicators may be provided over the views of virtual content. The visual indicators may be configured to convey one or more of relative position of a user object (e.g., their hand, finger, and/or other user object) with respect to virtual content in their field-of-view, perceived distance between the user object and virtual content, and/or other information.

A system configured to facilitate interactions with virtual content in an augmented reality environment may comprise one or more of one or more light sources, one or more optical elements, one or more hand tracking devices, non-transitory electronic storage, one or more physical processors, and/or other components.

It is noted that while one or more implementations described herein may be directed to augmented reality environments, this is for illustrative purposes only and not to be considered limiting. For example, in some implementations, one or more features and/or functions described herein may be carried out in a similar manner for virtual reality environments and/or other interactive environments.

The one or more hand tracking devices may be configured to generate output signals conveying positions of one or more digits of a user's hand over time. An individual hand tracking device may include one or more physical processors configured by machine-readable instructions, and/or other components. The one or more physical processor of a hand tracking device may be configured to determine, from the output signals, positions of the one or more digits over time.

The one or more light source may be configured to emit light forming images of virtual content. The virtual content may include a virtual object and/or other virtual content. The virtual object may be perceived at one or more distances from the user over time.

The one or more optical elements may be configured to provide the light emitted from the one or more light sources to one or more eyes of the user. The light provided to the one or more eyes of the user may generate the perceived three-dimensional light field within the user's field-of-view. In some implementations, an individual optical element may be configured such that the light may be provided to the one or more eyes of the user via reflection of the light off the individual optical element and into the one or more eyes. In some implementations, an individual optical element may be configured such that the light may be provided to the one or more eyes of the user by coupling the light into the one or more optical elements, propagating the light through the one or more optical elements, and guiding the light out of the one or more optical elements into the one or more eyes.

The one or more physical processors may be configured by machine-readable instructions. Executing the machine-readable instructions may cause the one or more physical processors to facilitate interactions with virtual content in an augmented reality environment. The machine-readable instructions may comprise one or more computer program components. The one or more computer program components may comprise one or more of a control component, a distance component, an input component, a mode component, and/or other components.

The control component may be configured to control one or more light sources to emit light forming images of virtual content. The control component may be configured such that views of virtual content may be formed by a three-dimensional light field so that the virtual content may be perceived to be within the user's field of view beyond the one or more optical elements. By way of non-limiting illustration, the virtual content may include a first virtual object perceived at a first position within the user's field of view at a first point in time. In some implementations, the first virtual object may include one or more content elements configured for interaction with one or more digits. The one or more content elements may include a first content element of the first virtual object. The first virtual object may include a planar virtual object displaying a web browser. The first content element may include a hyperlink and/or other elements configured for interaction with one or more digits. Other elements configured for interaction may include one or more of toggle boxes, drop down menus, sliding interfaces, and/or other elements.

The distance component may be configured to determine, based on positions of virtual content and one or more digits, perceived distances between the virtual content and the one or more digits over time. By way of non-limiting illustration, distance component may be configured to determine a first perceived distance between the first virtual object and a first digit at the first point in time.

The control component may be configured to further control the one or more light source to emit light forming images of one or more visual indicators. The one or more visual indicators may be provided on the images forming virtual content. An individual visual indicator may be configured to visually indicate one or more of positioning of an individual digit relative to virtual content, perceived distance between virtual content and an individual digit, and/or other indications. By way of non-limiting illustration, at the first point in time, the control component may be configured such that a visual indicator may be provided. The visual indicator may visually indicate one or more of a positioning of the first digit relative the first virtual object, the first perceived distance between the first digit and the first virtual object, and/or other indications. In some implementations, a positioning of the visual indicator at or near the first content element of the first virtual object may facilitate an interaction of the first digit with the first content element (e.g., selection of a hyperlink).

The input component may be configured to determine, from output signals of one or more hand tracking devices and/or other information, one or more gesture-based inputs being provided by a user. The one or more gesture-based inputs may include a first gesture based input and/or other inputs. The first gesture-based input may include one or more of a "scrolling" input, a "grabbing" input, and/or other inputs.

In some implementations, the mode component may be configured to disable and/or enable one or more gestured-based inputs based on a positioning of a visual indicator at or near one or more content elements present on virtual content. By way of non-limiting illustration, the mode component may be configured to disable the first gesture-based input based on the positioning of the visual indicator at or near the first content element of the first virtual object conveying that there may be an interaction of the first content element with the first digit.

In some implementations, the mode component may be configured to disable and/or enable one or more interactions between one or more digits and virtual content based on determining one or more gestured-based input being provided by a user. By way of non-limiting illustration, the mode component may be configured to disable the interaction of the first digit with the first content element based on determining that the first gestured-based input may be provided by the user.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
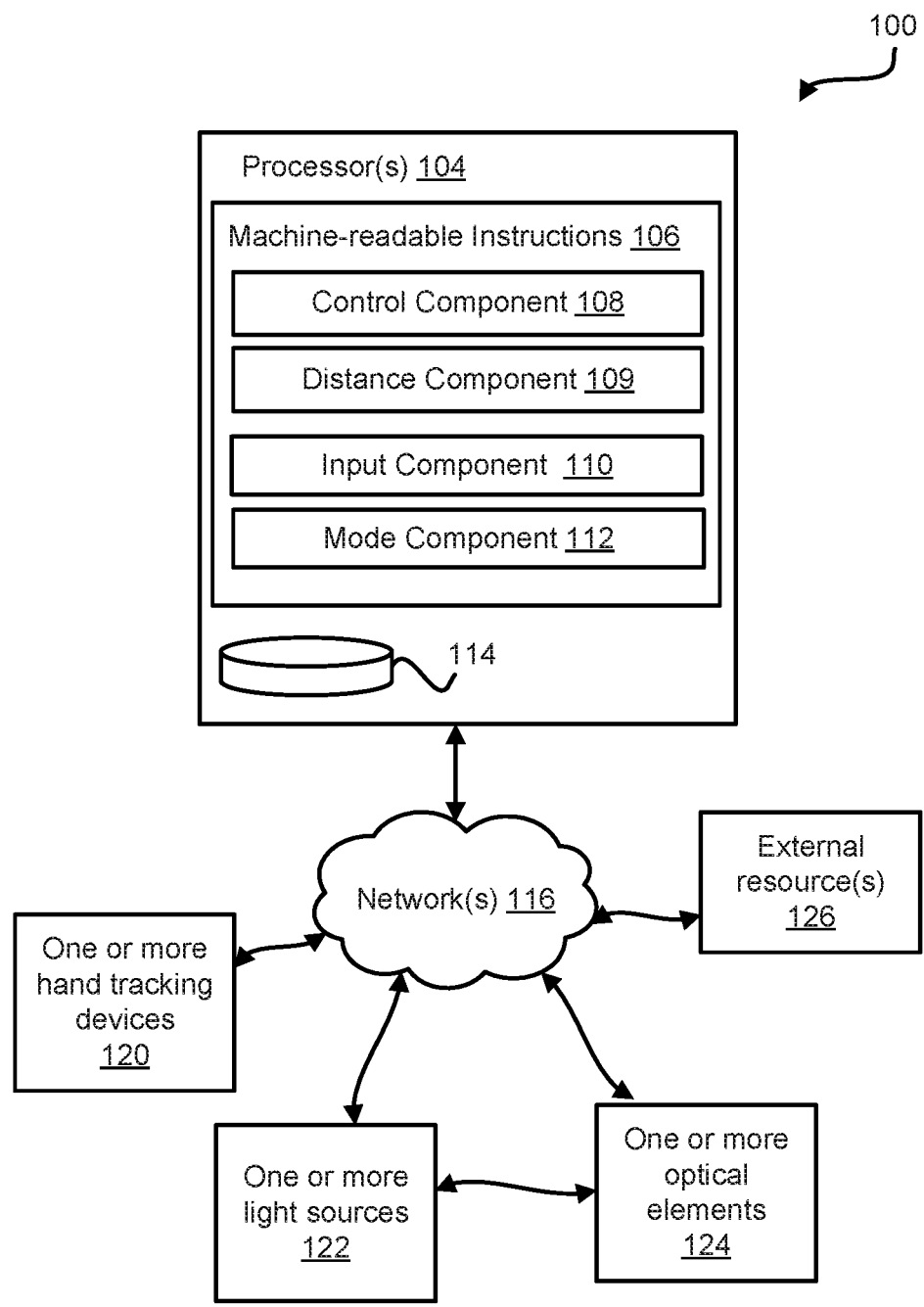
FIG. 1 illustrates a system configured to facilitate interactions with virtual content in an augmented reality environment, in accordance with one or more implementations.

FIG. 1 shows a system 100 configured to facilitate interactions with virtual content in an augmented reality environment, in accordance with one or more implementations. The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form or perceive coherent virtual content. Virtual content may include one or more virtual objects, and/or other content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

It is noted that while one or more features and/or functions of system 100 presented herein may be directed toward an augmented reality environment, this is for illustrative purposely only and is not to be considered limiting. In some implementations, one or more features and/or functions of system 100 may be similarly implemented for virtual reality environments and/or other interactive environments.

The system 100 may include one or more of one or more physical processors 104, one or more hand tracking devices 120, one or more light sources 122, one or more optical elements 124, and/or other components. In some implementations, one or more components of system 100 may be incorporated in a headset (e.g., a head-mounted display), and/or other devices (not shown in FIG. 1). By way of non-limiting illustration, one or more optical elements 124 may comprise at least part of a visor of an HMD.

In some implementations, individual light sources of one or more light sources 122 may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more light sources 122 may be positioned relative to one or more optical elements 124, such that light emitted from one or more light sources 122 may be received by one or more optical elements 124. In some implementations, control of position and/or light generation of individual light sources 122 may impact one or more aspects of a perceived three-dimensional light field and/or virtual content within the three-dimensional light field. One or more aspects of a perceived three-dimensional light field may include one or more of a perceived distance of the three-dimensional light field from the user, a depth of the perceived three-dimensional light field, and/or other aspects of the three-dimensional light field. One or more aspects of virtual content within a three-dimensional light field may include one or more of a perceived distance of the virtual content from a user, a depth of the virtual content, a size of the virtual content, and/or other aspects of the virtual content. For example, in some implementations, moving a position of an individual light source closer to an optical element may cause virtual content to be perceived closer to the user; while moving the position of the individual light source farther from the optical element may cause the virtual content to be perceived farther from the user.

In some implementations, one or more optical elements 124 may form at least part of a portion of a headset (not shown in FIG. 1) through which a user may view the real world. Individual optical elements of one or more optical elements 124 may be configured to provide the light emitted from the light source to an eye of the user to generate a perceived three-dimensional light field within the user's field-of-view.

In some implementations, individual optical elements of one or more optical elements 124 may comprise one or more reflective and/or partially reflective surfaces. An optical element may be formed from a reflective and/or partially reflective material. A reflective and/or partially reflective material may comprise one or more ZEONEX, Cyclo Olefin Polymer (COP), Cyclic Olefin Copolymer (COC), polycarbonate, Poly (methyl methacrylate) (PMMA), and/or other materials.

In some implementations, individual optical elements of one or more optical elements 124 may be arranged on a headset (not shown in FIG. 1) such that, when the headset is installed on the head of a user, the user's gaze may be directed toward the one or more optical elements 124. In some implementations, one or more optical elements 124 may be arranged on a headset such that, when the headset is installed on the head of the user, light rays generated by one or more light sources 122 may be directed onto one or more optical elements 124 to form images of virtual content on one or more optical elements 124. The images of virtual content formed on one or more optical elements 124 may be superimposed over the user's view of the real world through one or more optical elements 124 to create an augmented reality environment.

In some implementations, one or more optical elements 124 may be arranged on a headset such that light rays generated by one or more light sources 122 may be directed at one or more optical elements 124, coupled into one or more optical elements 124, and directed out of one or more optical element 124 into an eye of a user. The images of virtual content may be projected onto a retina of the eye such that the images may be superimposed over the user's view of the real world.

In some implementations, individual optical elements of one or more optical elements 124 may comprise a waveguide and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user. In some implementations, a waveguide may include one or more waveguides and/or other components as described in U.S. Provisional Patent Application No. 62/409,505, titled "IMAGE PROJECTION SYSTEMS AND METHODS," which is incorporated in its entirety herein by reference.

Figure 8:
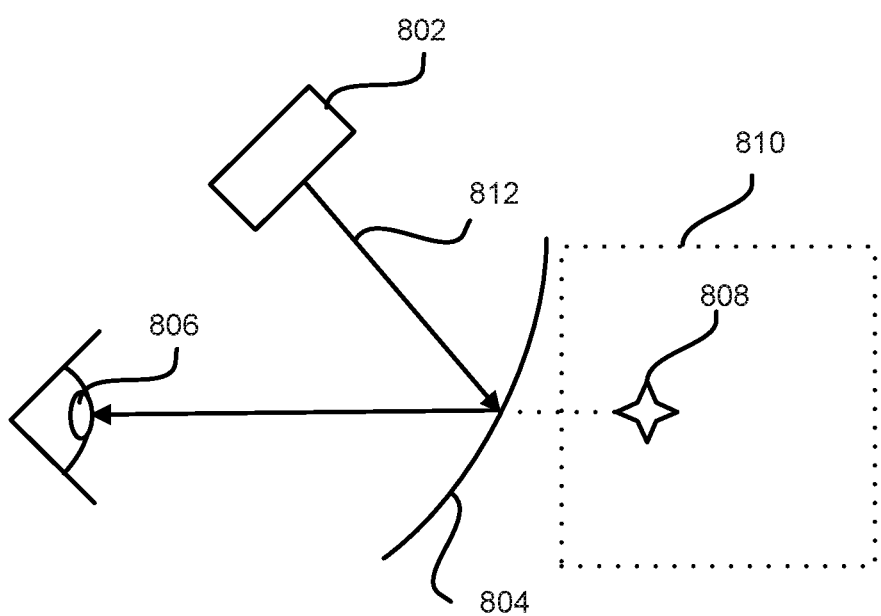
FIG. 8 illustrates an exemplary configuration of a light source and an optical element to generate virtual content to be perceived within a field-of-view of a user.

By way of non-limiting illustration, FIG. 8 shows an exemplary configuration of a light source 802 and an optical element 804 for generating virtual content 808 formed by a three-dimensional light field 810. In some implementations, one or more of light source 802, optical element 804, and/or other components may be incorporated into a headset (not shown in FIG. 8), such as an HMD and/or other devices. FIG. 8 shows a light beam 812 emitted from light source 802. The light beam 812 may be directed at optical element 804. In some implementations, light beam 812 may be reflected off optical element 804 into a user's eye 806. In some implementations, light beam 812 may be coupled into optical element 804, propagated through optical element 804, and guided out of optical element 804 into user's eye 806. The light beam 812 may be part of light generated by light source 802 configured to depict a digital image that may correspond to virtual content 808 perceived within the user's field-of-view.

Returning to FIG. 1, individual hand tracking devices of one or more hand tracking devices 120 may be configured to generate output signals conveying positions of one or more surfaces of one or more real-world objects within a real-world environment. In some implementations, the one or more surfaces of one or more real-world objects may include one or more surface of one or more user objects. A user object may include one or more of a hand, a palm of a hand, a digit, a set of digits, a tip of a digit, a set of tips for a set of digits, and/or other user objects.

In some implementations, one or more hand tracking devices 120 may include one or more of a camera, a three-dimensional scanner, a depth sensor, a rangefinder, a laser gauge, a time-of-flight sensor, an IR camera/emitter pair, a passive, structured, or unstructured light stereo pair, and/or other devices. In some implementations, sensor output of an individual hand tracking device may comprise a point cloud and/or other output. A point cloud may include a set of points that may lie on surfaces of real-world objects within a range of the hand tracking device, and/or other sensor output. The point cloud and/or other sensor output may be referred to generally as "position information."

In some implementations, a position of a surface may be expressed as one or more of distance from an individual hand tracking device, an angle from reference line (e.g., a horizontal line), and/or other information. A position may be represented as a vector having vector components.

In some implementations, an individual hand tracking device of one or more hand tracking devices 120 may include one or more physical processors (not shown in FIG. 1). The one or more physical processors of an individual hand tracking device may be configured by machine-readable instructions (not shown in FIG. 1). The machine-readable instructions of one or more physical processors of an individual hand tracking device may include one or more computer program components. A computer program component of machine-readable instructions of one or more physical processors of an individual hand tracking device may be configured to determine, from output signals generated by the individual hand tracking device, positions of one or more surfaces of one or more real-world objects within a real-world environment. By way of non-limiting illustration, positions of one or more digits and/or one or more tips of one or more digits may be determined from output signals generated by the individual hand tracking device.

It is noted that in some implementations, one or more physical processors of one or more hand tracking devices 120 may be included in and/or coupled with one or more physical processors 104.

It is noted that while one or more descriptions of tracking a user hand and/or making determinations of locations of a user hand and/or features with respect to virtual content are directed to use of a hand tracking device generating a point cloud, this is for illustrative purposes only and are not to be considered limiting. In some implementations, hand tracking may be accomplished using other approaches and/or other devices. For example, a camera and/or other imaging sensor configured to generate image information defining images of a real-world environment within a field-of-view of the camera. Hand tracking and/or location determination may be accomplished using one or more image-based approaches. The one or more image-based approaches may include one or more of computer vision, object recognition, SIFT, SURF, position triangulation, and/or other techniques. For example, while a point within a point cloud may represent a surface of a fingertip and may be used to track the location of the fingertip in three-dimensional space, similar tracking may be carried out using one or more image-based approaches including one or more identifying the fingertip in an image, tracking the fingertip over multiple images, and/or other operations. In this manner, a location determined for the fingertip via an image-based approach may be treated in the same or similar manner as a point within a point cloud representing the surface of the fingertip.

In some implementations, positions of one or more features of a hand may be determined through one or more iterations including operations of determining estimated positions of individual features from estimated positions of other ones of the features. Such an iterative procedure may be performed as output from a hand tracking device may be obtained. The output may be obtained based on a sampling rate of the hand tracking device.

In some implementations, an estimated position of a first feature may be determined from position information and/or other information. In an iteration, an estimated position of a second feature may be determined from the estimated position of the first feature. An estimated position of a set of features may be determined from the estimated position of the second feature. Another estimated position of the first feature may be determined from the estimated position of the set of features. An estimated position of the set of features may include a set of positions wherein individual positions in the set of positions correspond to individual features in the set of features. The estimated positions of the first feature may be compared to determine a difference between those positions.

Based on the difference being equal to or below a threshold distance, the positions of one or more of the first feature, second feature, set of features, and/or other features may be specified by the corresponding estimated featured positions used in the current iteration. The threshold distance may be within a range of 1 to 10 millimeters, and/or other ranges.

Based on the difference being equal to or above a threshold distance, one or more further iterations may be performed. At an iteration where a difference in estimated positions of the first feature may be below a threshold distance, the positions of one or more features may be specified by the estimated positions of the one or more features used in that iteration.

By way of non-limiting illustration, given a position of a first feature of a hand, a position of a second feature may be determined based on one or more of a range of distances from the position of the first feature that may be anatomically possible to correspond to the position of the second feature, one or more directions from the position of the first feature that may be anatomically possible to point to the position of the second feature, and/or other information. By way of non-limiting illustration, given a position of a wrist of a hand, a position of a thumb may be determined based on one or more of a range of distances from the wrist position that may be anatomically possible to correspond to the position of the thumb, one or more directions from the position of the wrist that may be anatomically possible to point to the position of the thumb, and/or other information.

In FIG. 1, one or more physical processors 104 may include and/or may be coupled to non-transitory electronic storage media 114 and/or other components. The non-transitory electronic storage media 114 may be configured to store virtual content information and/or other information. Virtual content information may define virtual content. In some implementations, virtual content may include one or more virtual objects, and/or other virtual content.

Individual virtual objects may be defined by one or more of size, shape, color, surface indicia, functionality, and/or other defining aspects. In some implementations, shapes of virtual objects may include one or more of spherical, planar, two- or three-dimensional polyhedron, and/or other shapes. Surface indicia on a virtual object may include one or more of text, graphics, images, and/or other indicia.

In some implementations, individual virtual objects may be associated with one or more application programs configured to provide functionality to the individual virtual objects. An individual virtual object may be associated with an individual application program by virtue of the individual virtual object providing an interface to the individual application program. An application program may include one or more of a web-browser, a video game, a word processor, a three-dimensional object file, a gallery of application programs, a virtual desktop, applications running on a virtual desktop, personal contacts, one or more software-enabled applications used in an augmented reality environment, and/or other application programs.

In some implementations, virtual objects may include one or more content elements configured for user interaction. User interactions may include one or more of gesture-based interaction, voice-based interactions, and/or other interactions. In some implementations, content elements of virtual objects may be configured for user interaction such that the content elements may be one or more of selected by a user, manipulated by a user, and/or otherwise interacted with by a user. User selections may be provided by gesture-based input including one or more of clicking, tapping, grabbing, and/or other inputs. User manipulation may be provided by gesture-based input including one or more of grabbing, swiping, pinching-to-zoom, throwing, and/or other inputs.

In some implementations, when a position of a digit may be at or within a threshold distance from a virtual object, certain events may occur. The events may include one or more interaction attempts (e.g., one or more of a "click attempt," a "click release attempt," and/or other interaction attempts). Based on certain user actions during those interactions, one or more of the interactions may be deemed successful (or not) and may (or may not) be carried out.

By way of non-limiting illustration, a click attempt on a content element may succeed even when the relative position of a user's digit may not be positioned exactly over the content element. In some implementations, the click may occur within a radius (see, e.g., FIG. 10) of the most recent position of the digit (e.g., a most recent hovered position). The most recent position of the digit may refer to the most recent position that "touched" a content element.

By way of non-limiting illustration, a "release attempt" may succeed even when a relative position of a user's digit may move from a "click attempt" position. In some implementations, a successful "click" creates a threshold radius centered at a clicked position. If the relative position of a user's digit stays within this radius until the "release attempt" event occurs, the release may succeed. In some implementations, there may be some other scenarios that may cause a "release attempt" to fail. By way of non-limiting example, these scenarios may include one or more of moving the relative position of a user's digit outside of a boundary of a virtual object, pushing the finger position too far behind a plane of the virtual object, and/or other user actions.

In some implementations, one or both of the above described click attempt and/or release attempt may permit the user to perform less-than-perfect interactions, while still achieving a successful result. A scenario may include a user's finger naturally travelling in an arc when making a "push in, then pull out" gesture for clicking, and these rules may provide some tolerance so that the user's natural motion may not cause failures as often. An alternative (i.e., forcing the user to perform a very mechanical in-and-out motion) may be harder for a user to master, perform naturally, and/or perform reliably.

By way of non-limiting illustration, a first virtual object may be associated with a first application program. The first virtual object may comprise a planar-shaped virtual object and/or other virtual object. The first application program may comprise a web browser and/or other application program. The first virtual object may be configured to depict a web browser interface. The first virtual object may be configured to be presented in front of a user as an interface to access the Internet. Input into the web browser may be provided by user input and/or other input (see, e.g., input component 110). The first virtual object may include a first content element and/or other content elements. The first content element may comprise a hyperlink and/or other content elements. The first content element may be configured for user interaction. The user interaction may include "clicking" and/or otherwise selecting the first content element via gesture based input and/or other input. In some implementations, clicking may be accomplished by bringing a tip of a digit to a position at or near the first content element to simulate a "contact" of the tip with the first content element.

The one or more physical processors 104 may be configured by machine-readable instructions 106. Executing machine-readable instructions 106 may cause one or more physical processors 104 to facilitate providing views of virtual content in an augmented reality environment. The machine-readable instructions 106 may include one or more of a control component 108, a distance component 109, an input component 110, a mode component 112, and/or other components.

In some implementations, control component 108 may be configured to control one or more components of system 100. In some implementations, control component 108 may be configured to control individual light sources of one or more light sources 122, and/or other components. In some implementations, control of individual light sources of one or more light sources 122 may include one or more of control of light generation and/or emission in accordance with instances of virtual content to be generated and presented in an augmented reality environment, control of position of individual light sources of one or more light sources 122, and/or other types of control.

By way of non-limiting illustration, control component 108 may be configured to control an individual light source to emit light forming images of the virtual content. The virtual content may be formed by a three-dimensional light field so that the virtual content may be perceived to be within the user's field of view beyond one or more optical element 124. The virtual content may have perceived positions within the user's field-of-view. The positions of virtual content may change over time. In some implementations, the virtual content may include a first virtual object and/or other virtual objects. The first virtual object may be configured to be perceived at a first position and/or other positions within the user's field of view at one or more points in time.

The distance component 109 may be configured to determine, based on one or more of positions of virtual content (e.g., determined based on control by output component 108), positions of one or more digits (e.g., determined via one or more hand tracking devices 120), perceived distances between the virtual content and the one or more digits (or tips of digits) over time, and/or other information. In some implementations, distance component 109 may be configured to determine a first perceived distance between the first virtual object and a first digit at a first point in time.

In some implementations, control component 108 may be configured to control one or more light sources 122 to emit light forming images of one or more visual indicators on virtual content. The one or more visual indicators may be provided on the images forming virtual content. An individual visual indicator may be configured to visually indicate one or more of perceived distance between virtual content and one or more digits (or other user objects), positioning of the one or more digits relative to virtual content, and/or other information. In some implementations, positioning of one or more digits relative to the virtual content may be determined by projecting the three-dimensional position(s) of the one or more digits onto the virtual object.

In some implementations, an individual visual indicator may include a circle and/or other shapes. The circle may include one or more of a circumference, a centroid, and/or other features. The circle may have a size defined by a diameter, a radius, and/or other dimensions. The size of the circle may be reflected by the size of the circumference. In some implementations, a positioning of the centroid of the circle may convey a position of an individual digit (or tip of a digit) relative to virtual content. In some implementations, a size of the circle may convey a perceived distance between an individual digit and virtual content. By way of non-limiting illustration, the diameter of the circle may increase as a perceived distance between an individual digit and virtual content increases. By way of non-limiting illustration, the diameter of the circle may decrease as a perceived distance between an individual digit and virtual content decreases. In some implementations, a relationship for the change of diameter of the circle versus the perceived distance may be described by an ease function. For example, the diameter may reduce at the same or similar rate as the tip of the digit comes close to the virtual content. This rate may increase gradually once the fingertip becomes closer than approximately 50% of a maximum distance. In some implementations, The visual indicator may be modified based on transparency. By way of non-limiting illustration, the visual indicator may fade out (e.g., in a linear fashion) as the finger travels away from the plane (e.g., from "near" to "far" thresholds). Because of this fade-out, the virtual indicator may not be visible in a size greater than a maximum defined diameter.

In some implementations, a centroid of a circle of a visual indicator may itself be a circle having a dimeter. In some implementations, a "contact" between a digit and virtual content may be visually indicated by virtue of the diameter of the circle decreasing to a size that may be the same or similar to the diameter of the centroid of the circle, and/or by other visual indications. In some implementations, the centroid may further be configured to exhibit a "trail" effect and/or other visual effects. A trail effect may include a line segment that may trail behind and/or otherwise follow the centroid as it traverses across a virtual object.

In some implementations, a visual indicator configured to visually indicate perceived distance between virtual content and one or more digits (or other user objects) may include one or more color indications. In some implementations, one or more color indications may be provided at or surrounding a perimeter of virtual content.

In some implementations, color indications may change depending on a current perceived distance. By way of non-limiting illustration, first color indication may be provided based on a perceived distance being within a first range of distances, a second color indications may be provided based on a perceived distance being within a second range of distances, a third color indication may be provided based on a perceived distance being within a third range of distances, and/or other color indications may be provided based on perceived distance being within other ranges of distances. The ranges may include distances that may with respect to a perceived "front" of the virtual content and/or a perceived "back" of the virtual content (e.g., in the event of a user "pushing through" the virtual content).

By way of non-limiting illustration, control component 108 may be configured to control a light source to emit light forming images of a visual indicator on the first virtual object. The visual indicator may visually indicate one or both of positioning of the first digit relative the first virtual object or perceived distance between the first virtual object and the first digit. The perceived distance indicated may be for the first virtual object and the first digit at one or more points in time.

By way of non-limiting illustration, control component 108 may be configured to control a light source to emit light forming images of a visual indicator configured to visually indicate perceived distance between a first digit and a first virtual object using color indications. The visual indicator may include a border and/or rim disposed around the first virtual object. The visual indicator may be configured to change color as an indication of the perceived distance between the first digit and the first virtual object. The color indications may include a first color indication based on a perceived distance being within a first range of distances, a second color indications may be provided based on a perceived distance being within a second range of distances, a third color indication may be provided based on a perceived distance being within a third range of distances, and/or other color indications. The first color indication may include the color red and/or other colors. The first range may be between 4 and 6 centimeters, and/or other ranges. The color red may be used to indicate that the perceived distance may be too short to facilitate an interaction. The second color indication may include the color yellow and/or other colors. The second range may be between 2 and 4 centimeters, and/or other ranges. The color yellow may be used to indicate that the perceived distance may be approaching a distances that may facilitate an interaction. The third color indication may include the color green and/or other colors. The third range may be between 0 and 2 centimeters, and/or other ranges. The color green may be used to indicate that the perceived distance may be suitable to facilitate an interaction.

FIG. 2-5 show various interactions between a user and virtual content that illustrate one or more implementations of a visual indicator as presented herein. The interactions shown generally include interactions between a user object 208 and a virtual object 202. The user object 208 may include a hand. The hand may include one or more digits, including a first digit 210. The first digit 210 may include a tip 212 and/or other features. The virtual object 202 may comprise a planar-shaped virtual object, and/or other types of virtual object. However, in other implementations, other shapes and/or forms of virtual object 202 may be contemplated.

It is noted that references to "position of first digit 210" and "distance between first digit 210 and virtual object 202" may generally refer to the position of tip 212 of first digit 210 and distance between tip 212 of first digit 210 and virtual object 202. For example, a user may interact with virtual content using their fingertip rather than the entire digit itself.

It is noted that FIGS. 2-5 are intended to illustrate what a user of system 100 (FIG. 1) may perceive viewing through an optical element of a headset. For example, an outside viewer not participating in an augmented reality environment may not be able to view or perceive the virtual object 202.

Figure 2:
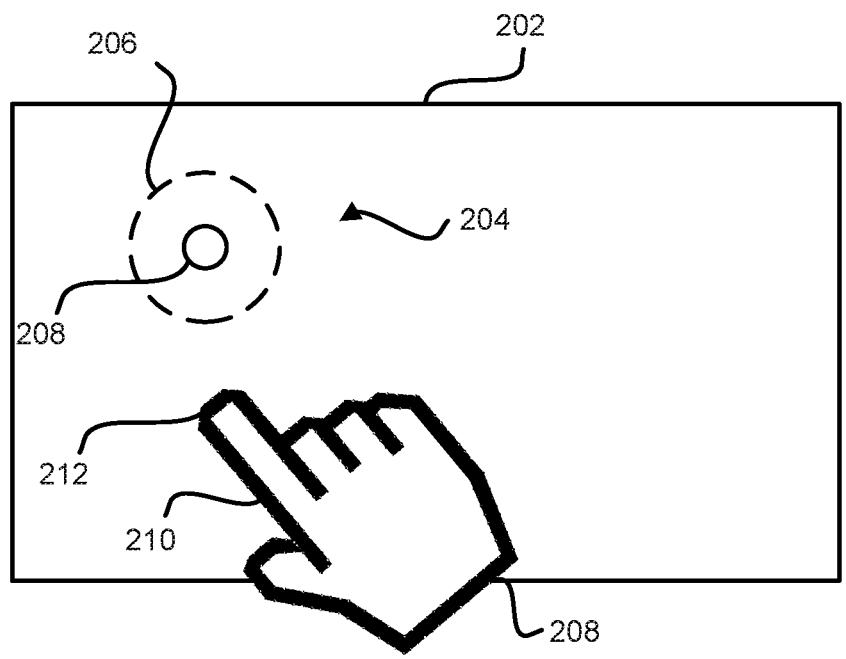
FIG. 2 illustrates an interaction with virtual content, in accordance with one or more implementations.
Figure 3:
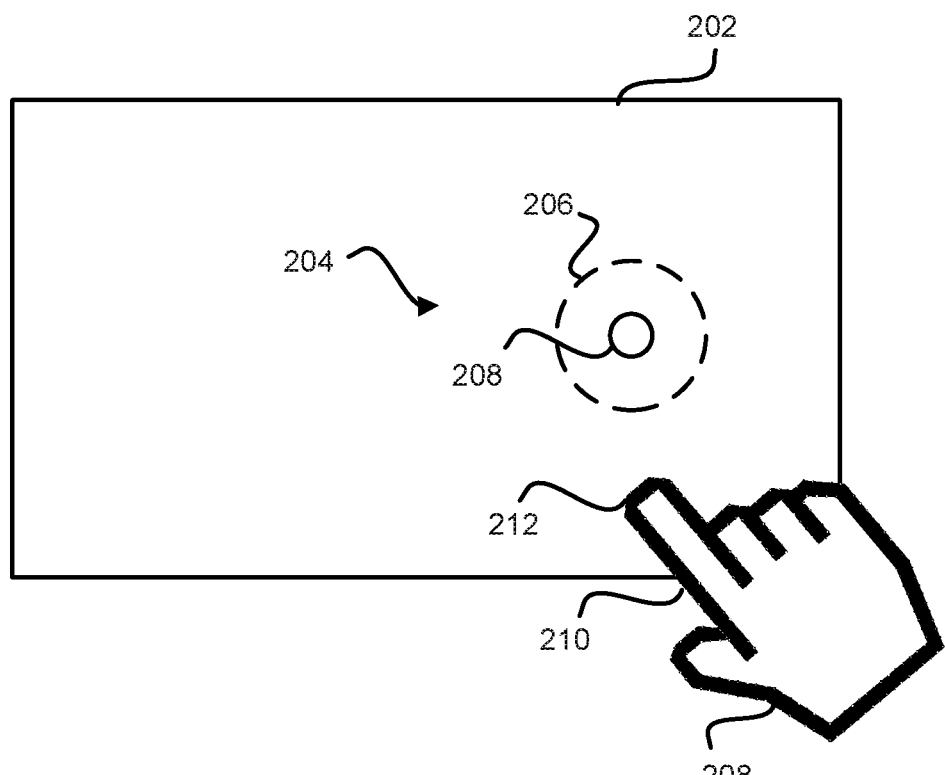
FIG. 3 illustrates an interaction with virtual content, in accordance with one or more implementations.

In FIG. 2, a visual indicator 204 is shown. The visual indicator 204 may be a circle perceived to lie on virtual object 202. The visual indicator 204 may include a circumference 206 (dashed line), a centroid 208 (inner circle), and/or other features. The visual indicator 204 may have a size defined by a diameter of the circle. The centroid 208 itself may comprise a circle having a size defined by a diameter. A positioning of centroid 208 may convey a positioning of tip 212 of first digit 210 relative virtual object 202 over time. In some implementations, the positioning of centroid 208 may be determined by projecting the three-dimensional position of tip 212 of first digit 210 onto the two-dimensional plane provided by virtual object 202. In FIG. 3, a new position of user object 208 (e.g., and therefore tip 212 of first digit 210) with respect to virtual object 202 is shown. The change in position of user object 208 may be reflected by visual indicator 204 translating across virtual object 202 as the user object 208 is moved across as well. In this sense, centroid 208 tracks the position of tip 212 of first digit 210 as the user object 208 is moved around in real-world space.

Figure 4:
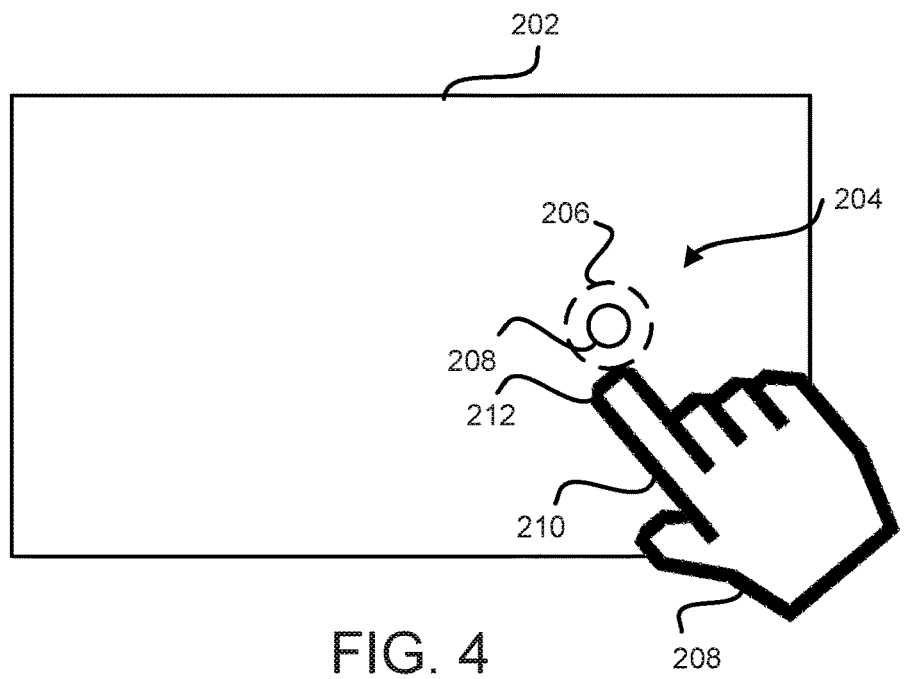
FIG. 4 illustrates an interaction with virtual content, in accordance with one or more implementations.
Figure 5:
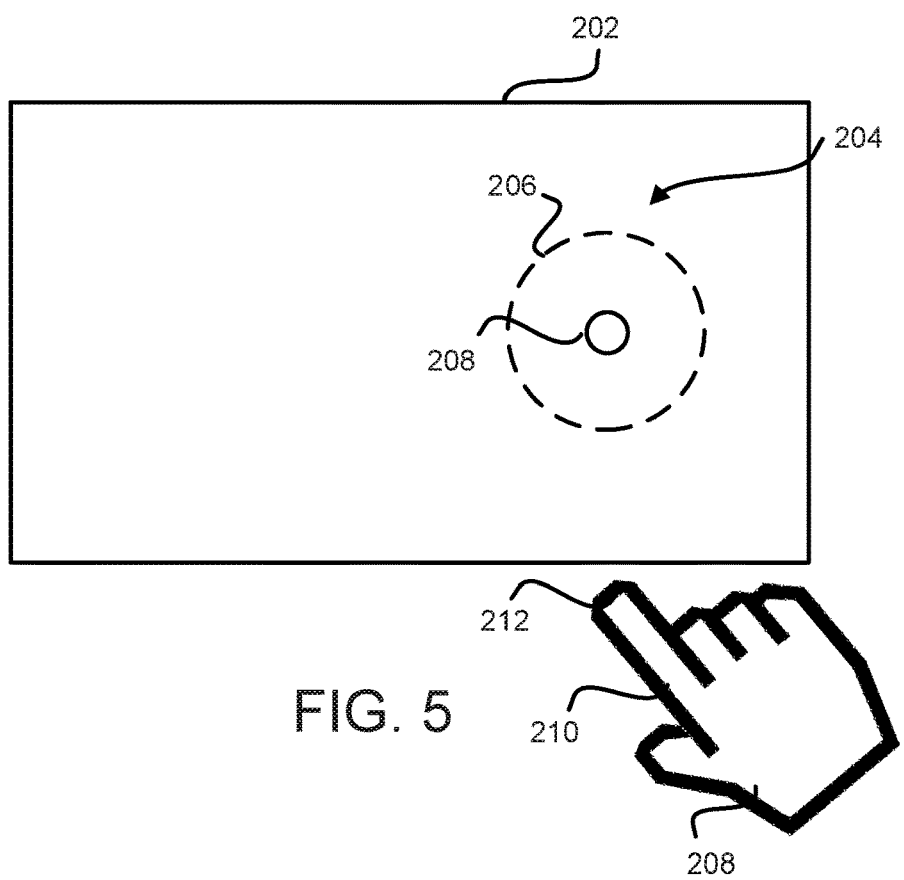
FIG. 5 illustrates an interaction with virtual content, in accordance with one or more implementations.

FIGS. 4-5 illustrate changes to visual indicator 204 responsive to changes to perceived distance between tip 212 of first digit 210 and virtual object 202.

FIG. 4 illustrates a relative decrease in the size of visual indicator 204 as tip 212 of first digit 210 is moved closer to virtual object 202 (e.g., relative the position of tip 212 of first digit 210 shown in FIG. 3). As tip 212 of first digit 210 approaches virtual object 202, the circumference 206 of visual indicator 204 approaches a size that may be the same or similar size as centroid 208 (see, e.g., FIG. 7).

FIG. 5 illustrates a relative increase in the size of visual indicator 204 as tip 212 of first digit 210 is moved farther from virtual object 202 (e.g., relative the position of tip 212 of first digit 210 shown in FIG. 4). As tip 212 of first digit 210 moves farther from virtual object 202, visual indicator 204 may become larger and consequently circumference 206 of visual indicator 202 may appear to become larger. In some implementations, visual indicator 204 may have a threshold maximum size indicative of the user object 208 being far from virtual object 202 such that a user interaction with virtual object 202 may not be occurring. In some implementations, threshold maximum size may include, for example, a diameter of 4 centimeters and/or other sizes. In some implementations, the threshold maximum size may correspond to tip 212 of first digit 210 being distanced 30 centimeters (or other amount) or more from virtual object 202. In some implementations, a perceived distance of 20 centimeters may correspond to a threshold maximum diameter of 2 centimeters.

Returning to FIG. 1, in some implementations, control component 108 may be configured to control one or more light sources 122 to emit light forming images of one or more visual indicators indicating user interactions, or attempted user interactions, with content element of virtual content. In particular, one or more visual indicators may be specifically configured to indicate a user interaction, or attempted user interaction, between a tip of a digit and a content element of a virtual object. In some implementations, one or more visual indicators configured to indicate a user interaction, or attempted user interaction, between a tip of a digit and a content element may be provided in response to a perceived distance between the tip of the digit and the content being indicative of an interaction. This may include the perceived distance being one or more of 2 centimeters, 1 centimeter, ½ centimeter, 0 centimeters, and/or other distances.

An individual visual indicator configured to indicate a user interaction, or attempted user interaction, between a tip of a digit and a content element may be provided as one or more of an additional virtual object overlaid on a virtual object (e.g., at or near the content element), a highlight provided within a virtual object (e.g., at or near the content element), and/or other type of indicators. By way of non-limiting illustration, a visual indicator may comprise a visual highlight being placed at or near a content element when a positioning of a tip of a digit at or near the content element conveys that a user may be attempting to interact with the content element with the tip of the digit (e.g., click on it).

In some implementations, a visual indicator configured to indicate a user interaction, or attempted user interaction, between a tip of a digit and a content element may be provided by augmenting a visual indicator configured to visually indicate one or more of perceived distance between virtual content and one or more digits (or other user objects), positioning of the one or more digits relative virtual content, and/or other information. By way of non-limiting illustration, the visual indicator configured to visually indicate one or more of perceived distance between virtual content and one or more digits (or other user objects), positioning of the one or more digits relative virtual content, and/or other information may be augmented by pulsing a centroid of the visual indicator, and/or other augmentations. For example, responsive to a positioning of a tip of a digit at or near the content element conveying that a user may be attempting to interact with the content element with the tip of the digit, a centroid of a visual indicator may enlarge (temporarily) and then return to an original size (e.g., pulsate).

In some implementations, control component 108 may be configured to control one or more light sources 122 to emit light forming images of one or more visual indicators indicating successful user interactions with content elements of virtual content. An individual visual indicator configured to indicate a successful user interaction between a tip of a digit and a content element may be provided as one or more a highlights of a visual indicator indicating relative position and/or perceived distances, and/or other type of indicators. By way of non-limiting illustration, a visual indicator may comprise a sequence or series of visual highlights being placed at or around a centroid of a visual indicator indicating relative position and/or perceived distance between a digit and virtual content. The sequence of visual highlights may include, for example, a simulation of sound waves emitting from a visual indicator responsive to a successful interaction with virtual content (e.g., a successful "click" of a content element, and/or other interactions). Visual indicators indicating successful user interactions with content elements of virtual content may be provided in other ways.

In some implementations, control component 108 may be configured to control one or more light sources 122 to emit light forming images of one or more visual indicators indicating attempted user interactions with content elements of virtual content. Attempted user interactions may include active attempts and/or passive attempts. An individual visual indicator configured to indicate an attempted user interaction between a tip of a digit and a content element may include a line segment connected between a visual indicator indicating relative position of the tip (e.g., it's centroid) and the content element, and/or other type of indicators. By way of non-limiting illustration, a visual indicator may comprise a line segment with a first end being positioned at or near a centroid of a visual indicator indicating relative position of a tip, a second end being positioned at or near a content element (e.g., a center and/or edge of the content element). In some implementations, the line segment may lengthen and/or shorten as the centroid moves farther and/or closer to the content element. In some implementations, the line segment may be omitted once the centroid reaches a threshold distance from the content element. In this sense, the line segment may appear to "stick" to the content element until the centroid is at or outside the threshold. For example, the threshold distance may indicate that the user may no longer be attempted to interact with the content element. In some implementations, the threshold distance may be within the range of 1-5 centimeters, and/or other distances. Visual indicators indicating attempted user interactions with content elements of virtual content may be provided in other ways.

Figure 6:
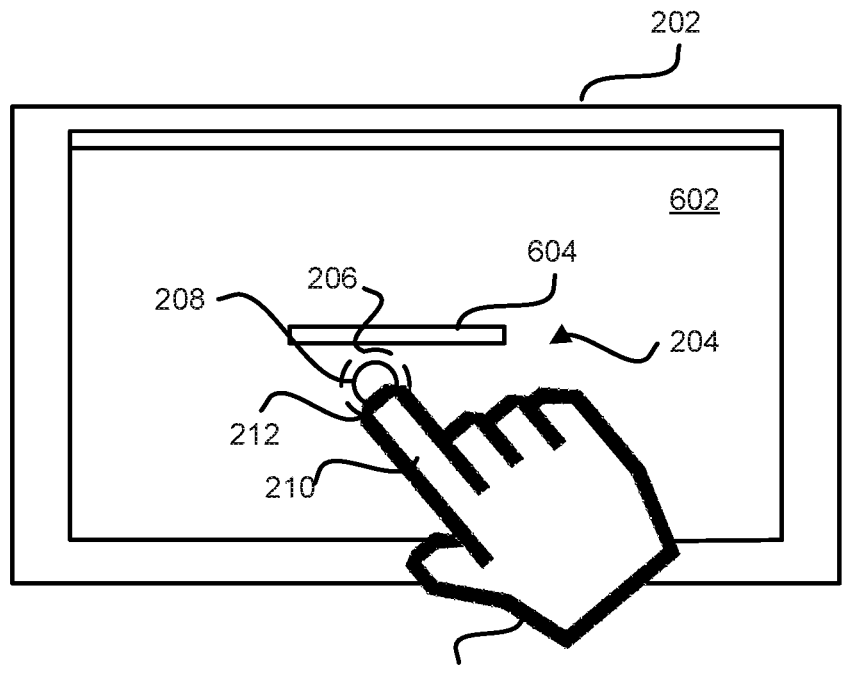
FIG. 6 illustrates an interaction with virtual content, in accordance with one or more implementations.
Figure 7:
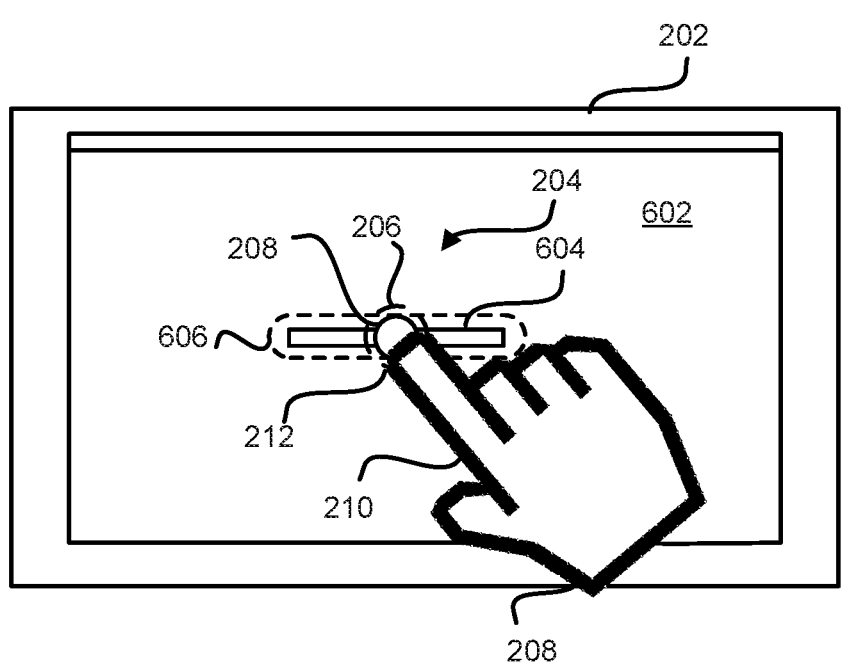
FIG. 7 illustrates an interaction with virtual content, in accordance with one or more implementations.

By way of non-limiting illustration, FIGS. 6-7 and 10-12 show interactions between a user and virtual content that illustrate one or more implementations of a visual indicator indicating user interactions (e.g., attempted user interactions and/or successful user interactions) with a content element of virtual content, as presented herein. FIGS. 6-7 may include the same or similar components as FIGS. 2-5, with like components referenced by like numerals.

In FIG. 6, virtual object 202 may display a web-browser 602 and/or other content. The web-browser 602 may include one or more content elements, such as a first content element 604. The first content element 604 may comprise, for example, a hyperlink, and/or other content elements. The tip 212 of first digit 210 may be approaching content element

604. This may be indicated by the position of centroid 208 at near content element 604; and/or the diameter of visual indicator 204 approaching the same or similar diameter as centroid 208 (e.g., conveying that a perceived distance between tip 212 of first digit 210 and virtual object 202 may be closing in).

In FIG. 7, tip 212 of first digit 210 may be at or near first content element 604. A perceived distance may be minimal (e.g., simulating a "contact") as visually indicated by the size of visual indicator 604 being at or near size of centroid 208. A visual indicator 606 configured to indicate a user interaction, or attempted user interaction, between tip 212 of first digit 210 and content element 604 may be provided as a highlight ring (dashed line) surrounding content element 604, and/or other indicator.

Figure 10:
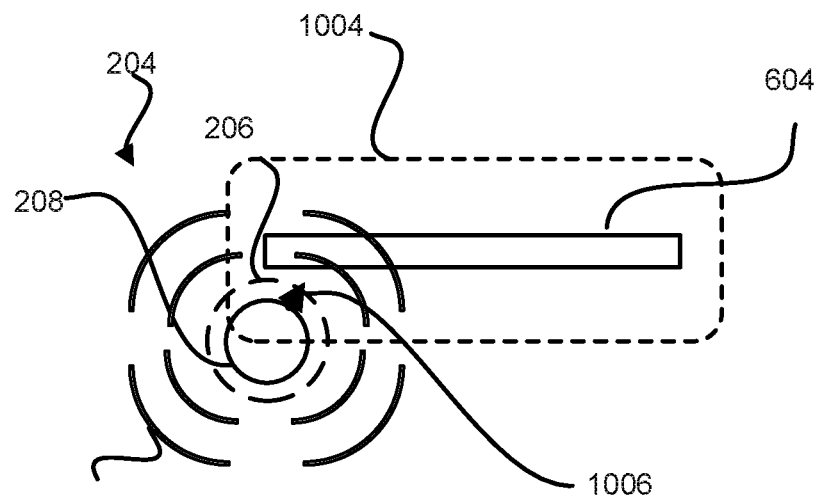
FIG. 10 illustrates an interaction with virtual content, in accordance with one or more implementations.

In FIG. 10, a sequence or series of highlights 1002 may be provided around visual indicator 204 indicating a successful interaction with content element 604.

Figure 11:
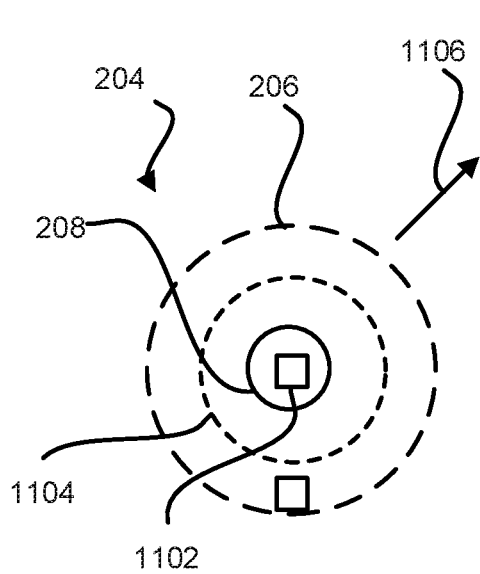
FIG. 11 illustrates an interaction with virtual content, in accordance with one or more implementations.
Figure 12:
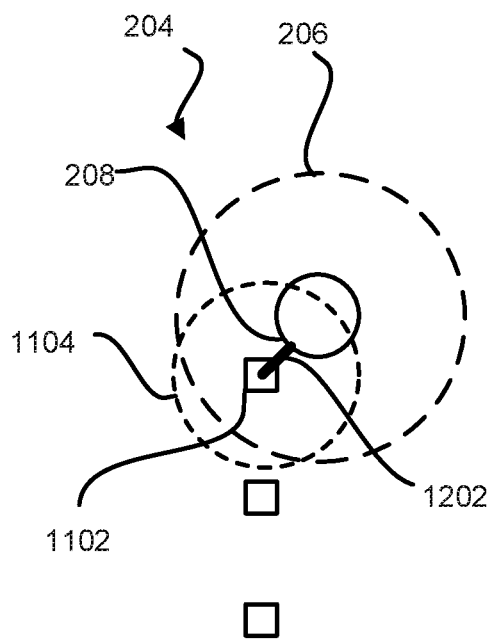
FIG. 12 illustrates an interaction with virtual content, in accordance with one or more implementations.

In FIG. 11, the visual indicator 204 and a second content element 1102 are shown. The second content element 1102 may comprise, for example, a toggle box (e.g., sometimes referred to as a "check box"). In FIG. 11, centroid 208 may be positioned over second content element 1102 and/or otherwise within an expanded interaction region 1104 of second content element 1102. Arrow 1106 indicates a direction of travel of the user's digit, such that visual indicator 204 may similarly follow. In FIG. 12, the visual indicator 204 has moved. Here, region 1104 may still be visible while centroid 208 may be within region 1104. Further, a line segment 1202 may be provided as a visual indicator configured to indicate an attempted user interaction between a tip of a digit and content element 1102. The line segment 1202 may be connected between centroid 208 of visual indicator 204 and second content element 1102.

Returning to FIG. 1, input component 110 may be configured to determine user input for manipulating virtual content in an augmented reality environment. The user input may comprise gesture based input and/or other input. In some implementations, user input may be derived from one or more of sensor output of one or more hand tracking devices 120, sensor output from one or more other sensors, and/or other sources. By way of non-limiting illustration, input component 110 may be configured to determine user input by detection and/or recognition of one or more real-world objects from sensor output from one or more hand tracking devices 120 and/or other sources. By way of non-limiting illustration, one or more real-world objects may be recognized based on one or more point clouds having points lying on one or more surface of the one or more real-world objects. A point cloud or portion of a point cloud having a shape of a known real-world object (e.g., a human hand) may be recognized as the real-world object.

In some implementations, input component 110 may be configured to identify gestures and/or actions being performed by one or more real-world objects. A gesture and/or action may include one or more of clicking, reaching, grabbing, releasing, swiping, pinching, pulling, throwing, pointing, and/or other gestures and/or actions. By way of non-limiting illustration, input component 110 may utilize one or more gesture recognition techniques to identify one or more gestures and/or actions being performed by a human hand. The input component 110 may be configured to provide one or more identified gestures and/or actions as user input for manipulating virtual content in an augmented reality environment.

By way of non-limiting illustration, input component 110 may be configured to determine user input comprising gesture-based input for manipulating a virtual object in an augmented reality environment. The virtual object may be manipulated based on one or more of a gesture of "grabbing", a gesture of "holding," a gesture of "pinch-to-zoom", a gesture of "scrolling," and/or other input.

In some implementations, input component 110 may be configured to determine an amount of simulated "force" a user may be applying to a virtual object. In some implementations, force may be determined based on one or more of a speed at which a gesture may be performed, a velocity at which a gesture may be performed, an acceleration at which a gesture may be performed, and/or other information. By way of non-limiting illustration, the faster a user moves their hand while holding a virtual object, the greater a simulated force may be determined to be applied to the virtual object, and vis versa.

In some implementations, input component 110 may be configured to define one or more regions around content elements of a virtual object in which user interaction may be facilitated. A content element itself may be configured for user interaction. For example, the content element itself (e.g., the area in which the content element may be disposed) may be configured for interaction (e.g., clickable). In some implementations, content element of virtual objects may be small relative other content on the virtual objects. For example, in a web-browser interface on a virtual object, a content element such as a hyperlink may be small relative to other content displayed on the virtual object (e.g., the hyperlink may be a line of relatively small text). The input component 110 may be configured to define one or more regions around content elements of a virtual object in which the interactive functions of the content elements may be expanded. A region may be one or more of circular, square, may contour with a shape of a content element, and/or may have other shapes. A region may include a boundary defined by a visible boundary line. In some implementations, a region around a content element may expand an interactive function of the content element insofar that user interactions within the region may be treated as if they were interactions with the content element directly.

In some implementations, control component 108 may be configured to control one or more light sources 122 to emit light forming images of one or more visual indicators indicating direction of a content element. In some implementations, one or more visual indicators indicating direction of a content element may be provided when a visual indicator indicating relative position of a tip of a digit may be within a region configured to expand an interactive function of the content element. By way of non-limiting illustration, when a centroid and/or other part of a visual indicator may be within a region configured to expand an interactive function of the content element, a second visual indicator may be provided on the visual indicator to indicate a direction of where the content element associated with the current region may be (e.g., within the region). The second visual indicator may include an arrow, and/or other visual indicators.

By way of non-limiting illustration in FIG. 10, content element 604 and visual indicator 204 are shown. A region 1004 may be provided around content element 604 which may expand the interactive functions of content element 604. In some implementations, when centroid 108 of visual indicator 204 is within region 1004, a second visual indicator 1006 may be provided. The second visual indicator 1006 may indicate a direction of content element 604 within region 1004. The second visual indicator 1006 may include, for example, an arrow and/or arrowhead. The second visual indicator 1006 may continue to indicate the direction of content element 604 while centroid 208 is within region 1004. If centroid 208 is directly over and/or abutting content element 604, second visual indicator 1006 may be omitted.

Returning to FIG. 1, in some implementations, mode component 112 may be configured to disable and/or enable one or more gestured-based inputs based on a positioning of a visual indicator at or near one or more content elements present on virtual content. The positioning of a visual indicator at or near one or more content elements present on virtual content may be indicative of a user attempting to interact with the content element with one or more digits. The one or more gestured-based inputs may be disabled as to not interfere with the attempted interaction with the content element.

By way of non-limiting illustration, mode component 112 may be configured to disable a first gesture-based input based on a positioning of a visual indicator at or near a first content element of a first virtual object conveying that there may be an interaction of the first content element with a user object (e.g., a first digit). In some implementations, the positioning of the visual indicator at or near the first content element of the first virtual object may be indicative of the user attempting to select the first content element with a tip of a digit. The one or more gesture-based inputs that may be disabled in response to the positioning of the visual indicator at or near the first content element of the first virtual object may include one or more of scrolling, pinching-to-zoom, grabbing, and/or other gestured-based inputs.

In some implementations, mode component 112 may be configured to disable and/or enable one or more interactions between one or more digits and virtual content based on determining that one or more gestured-based inputs may be provided by a user. The one or more gestured-based inputs may be indicative of a user attempting to interact with the content element specifically using the one or more gesture-based inputs. The interactions between one or more digits and virtual content (e.g., selecting or clicking a content element) may be disabled as to not interfere with the attempted gesture-based interaction(s).

By way of non-limiting illustration, mode component 112 may be configured to disable a first interaction of a first digit with a first content element of a first virtual object based on determining that a first gestured-based input may be provided by the user. The first interaction being disabled may be the user attempting to select the first content element with a tip of a digit. The first gesture-based input may include one or more of scrolling, pinching-to-zoom, grabbing, and/or other gestured-based inputs. In some implementations, the interactions that may be disabled may be based on an order in which occurrences of the interactions may be determined. One or more interactions occurring temporally first may be given priority (e.g., a later interaction may be disabled).

Returning to FIG. 1, processor(s) 104, one or more hand tracking devices 120, one or more light sources 122, one or more optical elements 124, external resources 126, and/or other components of system 100 may be operatively linked via one or more electronic communication links. For example, such electronic communication links may be established, at least in part, via network(s) 116. Network(s) 116 may comprise one or both of wired and/or wireless communications. It will be appreciated that this is not intended to be limiting and that the scope of this disclosure includes implementations in which processor(s) 104, one or more hand tracking devices 120, one or more light sources 122, one or more optical elements 124, external resources 126, and/or other components of system 100 may be operatively linked via some other communication media.

The external resources 126 may include sources of information, hosts, external entities participating with system 100, providers of virtual content, and/or other resources. In some implementations, some or all of the functionality attributed herein to external resources 126 may be provided by resources included in system 100.

The processor(s) 104 may include and/or have access to electronic storage 114, and/or other components. The processor(s) 104 may include communication lines or ports to enable the exchange of information with a network, electronic storage 114, and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 114 may comprise electronic storage media that electronically stores information. The electronic storage media of electronic storage 114 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 109, 110, and/or 112. Processor(s) 104 may be configured to execute components 108, 109, 110, and/or 112 by software; hardware; firmware; some combination of software, hardware, and/or firmware; and/or other mechanisms for configuring processing capabilities on processor(s) 104.

It should be appreciated that although components 108, 109, 110, and/or 112 are illustrated in FIG. 1 as being co-located within a single processing unit, in implementations in which processor(s) 104 includes multiple processing units, one or more of components 108, 109, 110, and/or 112 may be located remotely from the other components. The description of the functionality provided by the different components 108, 109, 110, and/or 112 described above is for illustrative purposes and is not intended to be limiting, as any of components 108, 109, 110, and/or 112 may provide more or less functionality than is described. For example, one or more of components 108, 109, 110, and/or 112 may be eliminated, and some or all of its functionality may be provided by other ones of components 108, 109, 110, 112, and/or other components. As another example, processor(s) 104 may be configured to execute one or more additional components that may perform some or all of the functionality attributed to one of components 108, 109, 110, and/or 112.

Figure 9:
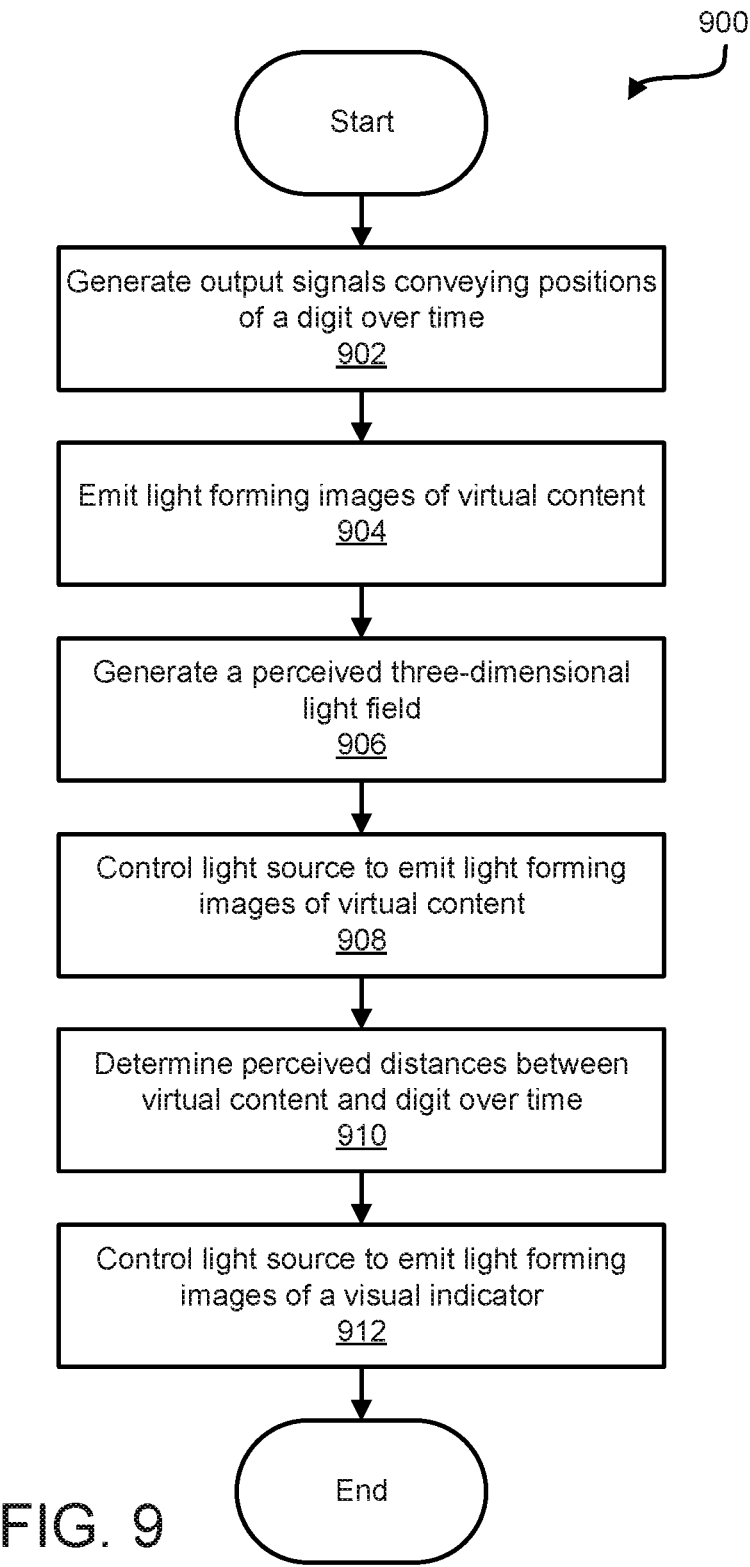
FIG. 9 illustrates a method to facilitate interactions with virtual content in an augmented reality environment, in accordance with one or more implementations.

FIG. 9 illustrates a method 900 of facilitating interactions with virtual content in an augmented reality environment, in accordance with one or more implementations. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

In some implementations, method 900 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more hand tracking devices, one or more optical elements, and/or other components. The one or more processing devices may include one or more devices executing some or all of the operations of method 900 in response to instructions stored electronically on electronic storage. The one or more processing devices may include one or more devices configured through hardware, firmware, and/or software to be specifically designed for execution of one or more of the operations of method 900.

At an operation 902, output signals conveying positions of a digit of a user's hand over time may be generated. In some implementations, operation 902 may be performed using one or more hand tracking devices the same as or similar to one or more hand tracking devices 120 (shown in FIG. 1 and described herein).

At an operation 904, light forming images of virtual content may be emitted. In some implementations, operation 904 may be performed using one or more light sources the same as or similar to one or more one or more light sources 122 (shown in FIG. 1 and described herein).

At an operation 906, a perceived three-dimensional light field within the user's field-of-view may be generated by providing the light emitted from the light source to an eye of the user. In some implementations, operation 906 may be performed one or more optical elements the same or similar to one or more optical elements 124 (shown in FIG. 1 and described herein).

At an operation 908, one or more light sources may be controlled to emit light forming the images of the virtual content formed by the three-dimensional light field. The virtual content may be perceived to be within the user's field of view beyond the one or more optical elements. The virtual content may include a first virtual object and/or other virtual content. The first virtual object may be perceived at a first position within the user's field of view at a point in time. In some implementations, operation 908 may be performed by one or more physical processors executing a control component the same as or similar to control component 108 (shown in FIG. 1 and described herein).

At an operation 910, perceived distances between the virtual content and the digit over time may be determined based on the positions of the virtual content and the digit. By way of non-limiting illustration, a first perceived distance between the first virtual object and the digit at the point in time may be determined. In some implementations, operation 910 may be performed by one or more physical processors executing a distance component the same as or similar to distance component 109 (shown in FIG. 1 and described herein).

At an operation 912, one or more light sources may be controlled to emit light forming the images of a visual indicator on the first virtual object and/or other virtual content. The visual indicator may visually indicate perceived distance between the virtual content and the digit, and/or other information. At the point in time, the visual indicator may visually indicate the first perceived distance between the digit and the first virtual object. The first perceived distance may be indicated for the first virtual object and the digit. In some implementations, operation 912 may be performed by one or more physical processors executing a control component the same as or similar to control component 108 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to facilitate interactions with virtual content in an augmented reality environment, the system comprising:
   a hand tracking device configured to generate output signals conveying positions of a digit of a user's hand over time;
   a light source configured to emit light forming images of virtual content;
   an optical element, the optical element being configured to provide the light emitted from the light source to an eye of the user to generate a perceived three-dimensional light field within the user's field-of-view;
   one or more physical processors configured by machine-readable instructions to:
      control the light source to emit the light forming the images of the virtual content, the virtual content being formed by the three-dimensional light field so that the virtual content is perceived to be within the user's field of view beyond the optical element, the virtual content including a first virtual object perceived at a first position within the user's field of view at a point in time;
      determine, based on the positions of the virtual content and the digit, perceived distances between the virtual content and the digit over time, including determining a first perceived distance between the first virtual object and the digit at the point in time;

control the light source to emit light forming images of a visual indicator on the first virtual object, the visual indicator visually indicating perceived distance between the virtual content and the digit and that the perceived distance indicated is for the first virtual object and the digit, such that at the point in time the visual indicator visually indicates the first perceived distance between the digit and the first virtual object and that the first perceived distance is indicated for the first virtual object and the digit, wherein the first virtual object includes a first content element, the first content element being configured for interaction with the digit, and wherein a positioning of the visual indicator at or near the first content element indicates the interaction of the digit with the first content element;

determine, from the output signals, one or more gesture-based inputs being provided by the user, the one or more gesture-based inputs including a first gesture based input; and disable the first gesture-based input based on the positioning of the visual indicator at or near the first content element indicating the interaction of the digit with the first content element.

2. The system of claim 1, wherein the visual indicator includes a circle having a centroid and a size defined by a diameter, wherein positioning of the centroid of the circle on the first virtual object conveys positioning of the digit relative the first virtual object, and the diameter of the circle conveys the first perceived distance between the digit and first virtual object.

3. The system of claim 1, wherein the position of the digit over time includes positions of a tip of the digit.

4. The system of claim 1, wherein the first virtual object has a planar shape.

5. The system of claim 1, wherein the first content element includes a hyperlink.

6. The system of claim 1, wherein the light source, the optical element, and the one or more physical processors are included in a headset configured to be worn by a user.

7. The system of claim 1, wherein the optical element is a waveguide or a partially reflective material.

8. A system configured to facilitate interactions with virtual content in an augmented reality environment, the system comprising:

a hand tracking device configured to generate output signals conveying positions of a digit of a user's hand over time;

a light source configured to emit light forming images of virtual content;

an optical element, the optical element being configured to provide the light emitted from the light source to an eye of the user to generate a perceived three-dimensional light field within the user's field-of-view;

one or more physical processors configured by machine-readable instructions to:

control the light source to emit the light forming the images of the virtual content, the virtual content being formed by the three-dimensional light field so that the virtual content is perceived to be within the user's field of view beyond the optical element, the virtual content including a first virtual object perceived at a first position within the user's field of view at a point in time;

determine, based on the positions of the virtual content and the digit, perceived distances between the virtual content and the digit over time, including determining a first perceived distance between the first virtual object and the digit at the point in time;

control the light source to emit light forming images of a visual indicator on the first virtual object, the visual indicator visually indicating perceived distance between the virtual content and the digit and that the perceived distance indicated is for the first virtual object and the digit, such that at the point in time the visual indicator visually indicates the first perceived distance between the digit and the first virtual object and that the first perceived distance is indicated for the first virtual object and the digit, wherein the first virtual object includes a first content element, the first content element being configured for interaction with the digit, and wherein a positioning of the visual indicator at or near the first content element indicates the interaction of the digit with the first content element;

determine, from the output signals, one or more gesture-based inputs being provided by the user, the one or more gesture-based inputs including a first gesture-based input; and disable the interaction of the digit with the first content element based on determining the first gestured-based input is being provided by the user.

9. A method to facilitate interactions with virtual content in an augmented reality environment, the method being implemented in a system comprising a hand tracking device, a light source, an optical element, one or more physical processors, and storage media storing machine-readable instructions, the method comprising:

generating, with the hand tracking device, output signals conveying positions of a digit of a user's hand over time;

emitting, with the light source, light forming images of virtual content;

generating a perceived three-dimensional light field within the user's field-of-view by providing, via the optical element, the light emitted from the light source to an eye of the user;

controlling, with the one or more physical processors, the light source to emit the light forming the images of the virtual content, the virtual content being formed by the three-dimensional light field so that the virtual content is perceived to be within the user's field of view beyond the optical element, the virtual content including a first virtual object perceived at a first position within the user's field of view at a point in time;

determining, with the one or more physical processors based on the positions of the virtual content and the digit, perceived distances between the virtual content and the digit over time, including determining a first perceived distance between the first virtual object and the digit at the point in time;

controlling, with the one or more physical processors, the light source to emit light forming images of a visual indicator on the first virtual object, the visual indicator visually indicating perceived distance between the virtual content and the digit and that the perceived distance indicated is for the first virtual object and the digit, such that at the point in time the visual indicator visually indicates the first perceived distance between the digit and the first virtual object and that the first perceived distance is indicated for the first virtual object and the digit, wherein the first virtual object includes a first content element, the first content element being configured for interaction with the digit, and wherein a positioning of the visual indicator at or near the first content element indicates the interaction of the digit with the first content element;

determining, using the one or more physical processors and from the output signals, one or more gesture-based inputs being provided by the user, the one or more gesture-based inputs including a first gesture based input; and disabling, using the one or more physical processors, the first gesture-based input based on the positioning of the visual indicator at or near the first content element facilitating the interaction of the digit with the first content element.

10. The method of claim 9, wherein the visual indicator includes a circle having a centroid and a size defined by a diameter, wherein positioning of the centroid of the circle on the first virtual object conveys positioning of the digit relative the first virtual object, and the diameter of the circle conveys the first perceived distance between the digit and first virtual object.

11. The method of claim 9, wherein the position of the digit over time includes positions of a tip of the digit.

12. The method of claim 9, wherein the first virtual object has a planar shape.

13. The method of claim 9, wherein the first content element includes a hyperlink.

14. The method of claim 9, wherein the light source, the optical element, and the one or more physical processors are included in a headset configured to be worn by a user.

15. The method of claim 9, wherein the optical element is a waveguide or a partially reflective material.

16. A method to facilitate interactions with virtual content in an augmented reality environment, the method being implemented in a system comprising a hand tracking device, a light source, an optical element, one or more physical processors, and storage media storing machine-readable instructions, the method comprising:

generating, with the hand tracking device, output signals conveying positions of a digit of a user's hand over time;

emitting, with the light source, light forming images of virtual content;

generating a perceived three-dimensional light field within the user's field-of-view by providing, via the optical element, the light emitted from the light source to an eye of the user;

controlling, with the one or more physical processors, the light source to emit the light forming the images of the virtual content, the virtual content being formed by the three-dimensional light field so that the virtual content is perceived to be within the user's field of view beyond the optical element, the virtual content including a first virtual object perceived at a first position within the user's field of view at a point in time;

determining, with the one or more physical processors based on the positions of the virtual content and the digit, perceived distances between the virtual content and the digit over time, including determining a first perceived distance between the first virtual object and the digit at the point in time;

controlling, with the one or more physical processors, the light source to emit light forming images of a visual indicator on the first virtual object, the visual indicator visually indicating perceived distance between the virtual content and the digit and that the perceived distance indicated is for the first virtual object and the digit, such that at the point in time the visual indicator visually indicates the first perceived distance between the digit and the first virtual object and that the first perceived distance is indicated for the first virtual object and the digit, wherein the first virtual object includes a first content element, the first content element being configured for interaction with the digit, and wherein a positioning of the visual indicator at or near the first content element indicates the interaction of the digit with the first content element;

determining, using the one or more physical processors and from the output signals, one or more gesture-based inputs being provided by the user, the one or more gesture-based inputs including a first gesture-based input; and disabling, using the one or more physical processors, the interaction of the digit with the first content element based on determining the first gestured-based input is being provided by the user.

* * * * *